US007555413B2

(12) United States Patent  
Inagaki

(10) Patent No.: US 7,555,413 B2  
(45) Date of Patent: Jun. 30, 2009

(54) METHOD AND COMPUTER STORAGE MEDIUM FOR DETERMINING A WALL-DAMPING FUNCTION USED IN THE SUBGRID-SCALE MODELING FOR LARGE EDDY SIMULATION

(75) Inventor: Masahide Inagaki, Nagoya (JP)

(73) Assignee: Kabushiki Kaisha Toyota Chuo Kenyyusho, Aichi-gun (JP)

( * ) Notice: Subject to any disclaimer, the term of this patent is extended or adjusted under 35 U.S.C. 154(b) by 325 days.

(21) Appl. No.: 10/986,388

(22) Filed: Nov. 12, 2004

(65) Prior Publication Data

US 2005/0107995 A1 May 19, 2005

(30) Foreign Application Priority Data

Nov. 14, 2003 (JP) ............................ 2003-385878  
Sep. 17, 2004 (JP) ............................ 2004-271304

(51) Int. Cl.  
*G06F 17/00* (2006.01)

(52) U.S. Cl. ............................................. 703/2; 703/7

(58) Field of Classification Search .................. 703/2, 703/9, 7; 702/12, 97, 138, 179  
See application file for complete search history.

(56) References Cited

U.S. PATENT DOCUMENTS 7,209,873 B1 * 4/2007 Kliegel ........................ 703/9

2004/0181377 A1 * 9/2004 Teraji et al. .................. 703/6

OTHER PUBLICATIONS

G. Easom, "Improved Turbulence Models for Computational Wind Engineering", Jan. 2000.*  
A. Bakker, "Lecture 9-Kolmogorov's Theory Applied Computational Fluid Dynamic", 2002, pp. 1-39.*  
E. Y. K. Ng, Y. Tan, H. N. Lim, D. Choi, "Near-Wall function for turbulence closure models," Spring-Verlag 2002, pp. 178-181.*  
C. G. Speziale, "A combined Large-Eddy Simulation and Time-Dependent RANS Capability for High-Speed Compressible Flows," vol. 13, No. 3, Sep. 1998.*  
Y. Nagano, C. Q. Pei, and H. Hattori, "A new low-Reynolds-number one-equation model of turbulence"1999.*

(Continued)

*Primary Examiner*—Kamini S Shah  
*Assistant Examiner*—Kibrom K Gebresilassie  
(74) *Attorney, Agent, or Firm*—Oblon, Spivak, McClelland, Maier & Neustadt, P.C.

(57) ABSTRACT

A wall-damping function is defined by the use of a Kolmogorov's velocity scale. A dissipation rate $\epsilon_{SGS}$ of SGS turbulent energy for components of a wave number smaller in scale than a grid filter size is not used as it is in place of a dissipation rate for components of all wave numbers of turbulent energy, but the dissipation rate $\epsilon_{SGS}$ of SGS turbulent energy for components of a wave number smaller in scale than a grid filter size is converted to a dissipation rate for components of all wave numbers of turbulent energy by a predetermined wave number (grid filter size) when turbulent flow is modeled and a distance from the surface of a wall.

6 Claims, 7 Drawing Sheets

OTHER PUBLICATIONS

T.G. Thomas, J. J. R. Williams, "Generating a wind environment for large eddy simulation of bluff body flows" 1999 Elsevier.*

C. Fureby, and F. F. Grinstein, "LArge Eddy Simulation of High-Reynolds-Number Free and Wall-Bounded Flows," 2002 Elsevier.*

S. H. Peng, L. Davidson, "On a subgrid-scale heat flux model for large eddy simulation of turbulent thermal flow," 2002 Elsevier.*

L. Jiachun, "Large Eddy Simulation of Complex Turbulent Flows: Physical Aspects and Research Trends", vol. 17, No. 4, Nov., pp. 289-301, 2001.*

F. Charlette, C. Meneveau, and D. Veynante, "A Power-Law Flame Wrinkling Model for LES of Premixed Turbulent Combustion Part I: Non-Dynamic Formulation and Initial Tests" pp. 159-180, 2002.*

Y. Nagano, C.Q. Pei, and H. Hattori, "A New Low-Reynolds Number One-Equation Model of Turbulence" 1999.*

Ken-ichi Abe, et al. "Toward the Development of an Algebraic Turbulent Heat Flux Model with the Aid of LES Data", Transactions of the Japan Society of Mechanical Engineers, vol. 64, No. 623, B(1998), pp. 2208-2215.

* cited by examiner

PRIOR ART

20 SURFACE OF WALL

FLOW

*RANS: GENERIC NAME FOR TURBULENT FLOW MODEL OF TIME AVERAGE TYPE, SUCH AS K-ε MODEL
ABBREVIATION OF REYNOLDS AVERAGED NAVIER-STOKES

CASE OF RANS*

$L_C$ : CUT-OFF WAVE NUMBER $\sim (2\pi\Delta)^{-1}$
$\Delta$ : COMPUTATIONAL GRID WIDTH
$L_k$ : KOLMOGOROV'S LENGTH SCALE (SCALE WHERE TURBULENT VARIATION IS DISSIPATED BY THE VISCOSITY OF FLUID)

CASE OF LES

FIG. 8

[Table 1]

Computation grid resolution

| | L1 × L2 × L3 | number of computation grid points | ν(m²/s) | Uc(m/s) | $\Delta x^+$ | $\Delta y^+$ | $\Delta z^+$ |
|---|---|---|---|---|---|---|---|
| Case1 | 6.4δ × 2δ × 1.6δ | 64 × 62 × 64 | 3.3 × 10⁻⁵ | 4.2 | 18.0 | 0.5~14.1 | 4.5 |
| Case2 | 6.4δ × 2δ × 1.6δ | 64 × 62 × 64 | 1.5 × 10⁻⁵ | 4.2 | 39.5 | 1.1~30.9 | 9.9 |
| Case3 | 12.8δ × 2δ × 3.2δ | 32 × 62 × 32 | 1.5 × 10⁻⁵ | 4.3 | 79.0 | 1.1~30.9 | 19.8 |
| Case4 | 12.8δ × 2δ × 6.4δ | 32 × 62 × 32 | 1.5 × 10⁻⁵ | 4.9 | 79.0 | 1.1~30.9 | 39.5 |
| Case5 | 51.2δ × 2δ 12.8δ | 32 × 62 × 32 | 1.5 × 10⁻⁵ | 5.8 | 316.0 | 1.1~30.9 | 79.0 |

METHOD AND COMPUTER STORAGE MEDIUM FOR DETERMINING A WALL-DAMPING FUNCTION USED IN THE SUBGRID-SCALE MODELING FOR LARGE EDDY SIMULATION

CROSS-REFERENCE TO RELATED APPLICATION

This application claims priority under 35USC 119 from Japanese Patent Applications No. 2003-385878 and No. 2004-271304 the disclosure of which is incorporated by reference herein.

BACKGROUND OF THE INVENTION

1. Field of the Invention

The present invention relates to a physical quantity computation program and a storage medium for storing the physical quantity computation.

2. Description of the Related Art

According to Large Eddy Simulation (LES) that is one of highly accurate numerical analysis methods of a turbulent flow ("Study of enhancing the accuracy of a gradient diffusion type thermal flux model on the basis of LES data", Transactions of the Japan Society of Mechanical Engineers, Vol. 64, No. 623, B(1998), page 2208-2215), by subjecting a dominating equation to a grid filter, turbulent components (GS components) larger in scale than a grid filter size are directly computed and turbulent components smaller in scale than the grid filter size are modeled and solved by a sub-grid scale (SGS) model. Hence, the computation accuracy of the LES heavily depends on the accuracy of the used SGS model. Most of the typical SGS models are based on eddy viscosity approximation and are modeled by giving turbulent viscosity. At this time, it is said that the turbulent viscosity needs to be multiplied by a wall-damping function to consider the wall effect near the surface of the wall. That is, when the whole fluid including fluid near the surface of the wall is analyzed by a turbulent model that assumes a sufficiently turbulent flow field away from the surface of the wall, a turbulent viscosity becomes too large in the fluid near the surface of the wall. Hence, to express a damping effect near the surface of the wall, a wall-damping function is used. Therefore, it is well known that the way this wall-damping function is given has a significant effect on the accuracy of computation.

By the way, in addition to the LES, a method of using a k-$\epsilon$ model is well known as a method of analyzing a turbulent flow. Even the k-$\epsilon$ model needs the above-described wall-damping function. It is reported that as for a wall-damping function of the K-$\epsilon$ model, when a Kolmogorov's velocity scale is used as a parameter, an appropriate wall-damping function can be constructed.

In this regard, turbulent variation has the property of being dissipated at a certain wave number by the molecular viscosity of fluid and the Kolmogorov's velocity scale is a velocity scale closely related to this wave number and is expressed by the use of the dissipation rate $\epsilon$ of turbulent energy.

Here, it is also thought that the above-described wall-damping function using the Kolmogorov's velocity scale is used not in the K-$\epsilon$ model but in the LES.

However, in the LES, as described above, only the turbulent components smaller in scale than the grid filter size are modeled and solved and the dissipation rate $\epsilon$ of turbulent energy is not solved, so that the above-described wall-damping function using the Kolmogorov's velocity scale can not be used as it is.

Hence, in the LES, in the case of using the above-described wall-damping function using the Kolmogorov's velocity scale, it is proposed that in place of the dissipation rate $\epsilon$ of the whole turbulent energy, the dissipation rate of SGS turbulent energy for the components of wave numbers smaller in scale than the grid filter size is used.

However, the dissipation rate of SGS turbulent energy for the components of wave numbers smaller in scale than the grid filter size is smaller in scale than the dissipation rate $\epsilon$ for the components of all wave numbers of the turbulent energy and depends on the grid size. Hence, when the above-described wall-damping function is specified by the use of the dissipation rate of SGS turbulent energy for the components of wave numbers smaller in scale than the grid filter size, an appropriate damping effect can not be produced and the wall-damping function becomes one heavily depending on the grid size used for computation, which results in reducing the accuracy of computation.

SUMMARY OF THE INVENTION

The present invention has been made in view of the above facts and the object of the invention is to provide a physical quantity computation program and a storage medium for storing the physical quantity computation program capable of computing a physical quantity of specifying a wall-damping function with high accuracy.

In order to achieve the above object, according to the first aspect of the invention, there is provided a storage medium for storing a physical quantity computation program or the physical quantity computation program that makes a computer compute a physical quantity of specifying a wall-damping function, which is used when turbulent components larger than a predetermined wave number within a wave number range of specifying a plurality of different kinds of turbulent flows are modeled and analyzed, by the use of a parameter of specifying the physical quantity, or a storage medium for storing the physical quantity computation program, wherein the physical quantity computation program computes the physical quantity by using a value predicted for the value of the parameter determined over the whole wave number range on the basis of the value of the parameter determined within the modeled range as the value of the parameter.

That is, this physical quantity computation program makes a computer compute a physical quantity of specifying a wall-damping function, which is used when turbulent components larger than a predetermined wave number within a wave number range of specifying a plurality of different kinds of turbulent flows are modeled and analyzed, by the use of a parameter of specifying the physical quantity.

As described above, the wall-damping function is used when turbulent components larger than a predetermined wave number within a wave number range of specifying a plurality of different kinds of turbulent flows are modeled and analyzed and, to be more detailed, defines the wall effect of the surface of a wall on fluid flowing near the surface of the wall of a body.

The invention makes a computer compute a physical quantity of specifying this wall-damping function by the use of a parameter of specifying the physical quantity. In this case, it is also thought that the value of the parameter determined within a modeled range as described above, but the value of this parameter is determined within the modeled range and hence the physical quantity of specifying the physical quantity of the wall-damping function can not be computed with high accuracy.

Therefore, according to the invention, the physical quantity of specifying the wall-damping function is computed by using a value predicted for the value of the parameter determined over the whole wave number range on the basis of the value of the parameter determined within the modeled range as the value of the parameter.

In this manner, the physical quantity of specifying the wall-damping function is computed by using a value predicted for the value of the parameter determined over the whole wave number range on the basis of the value of the parameter determined within the modeled range, so that the physical quantity of specifying the wall-damping function can be computed with high accuracy.

By the way, as the predicted value may be used a value obtained by converting the value of the parameter determined within the modeled range to a value of the parameter determined over the whole wave number range by the use of the predetermined wave number and a distance from the surface of a wall.

Further, the physical quantity of specifying the wall-damping function is a physical quantity closely related to a wave number at which turbulent variation dissipates, that is, a physical quantity determined by the molecular viscosity of the fluid and closely related to a wave number at which turbulent variation dissipates. The physical quantity of specifying the wall-damping function may be, for example, a Kolmogorov's velocity scale or the square root of turbulent energy.

As described above, there is provided a physical quantity computation program capable of computing the physical quantity of specifying the wall-damping function with high accuracy, so that there is provided a program of computing the other physical quantity by the use of the physical quantity computed by this physical quantity computation program.

That is, according to the second aspect of the invention, there is provided a wall-damping function computation program or a storage medium for storing the wall-damping function computation program, wherein the wall-damping function computation program makes a computer compute a wall-damping function on the basis of the physical quantity computed by the physical quantity computation program described above.

Further, according to the third aspect of the invention, there is provided a turbulent viscosity computation program or a storage medium for storing the turbulent viscosity computation program, wherein the turbulent viscosity computation program makes a computer compute a turbulent viscosity on the basis of the physical quantity computed by the physical quantity computation program described above. In this regard, the turbulent viscosity computation program may be a program that makes a computer compute a turbulent viscosity on the basis of a wall-damping function computed by the wall-damping function computation program according to the second aspect.

Still further, according to the fourth aspect of the invention, there is provided a fluid analysis program or a storage medium for storing the fluid analysis program, wherein the fluid analysis program makes a computer analyze fluid on the basis of the physical quantity computed by the physical quantity computation program described above. In this regard, the fluid analysis program may be a program that makes a computer analyze the fluid on the basis of the wall-damping function computed by the wall-damping function computation program according to the second aspect. Still further, the fluid analysis program may be a program that makes a computer analyze the fluid on the basis of a turbulent viscosity computed by the turbulent viscosity computation program.

Still further, there is also proposed the following device.

That is, there is provided a physical quantity computation device for computing a physical quantity of specifying a wall-damping function, which is used when turbulent components larger than a predetermined wave number within a wave number range of specifying a plurality of different kinds of turbulent flows are modeled and analyzed, by the use of a parameter of specifying the physical quantity, and the device is characterized in that the physical quantity is computed by using a value predicted for the value of the parameter determined over the whole wave number range on the basis of the value of the parameter determined within the modeled range as the value of the parameter.

Here, the predicted value may be a value obtained by converting the value of the parameter determined within the modeled range to the value of the parameter determined over the whole wave number range by the use of the predetermined wave number and a distance from the surface of a wall.

Further, the physical quantity may be a physical quantity closely related to a wave number at which turbulent variation dissipates or may be a Kolmogorov's velocity scale.

Still further, the physical quantity may be the square root of turbulent energy.

Still further, there are provided a wall-damping function computation device that computes a wall-damping function on the basis of the above-described physical quantity, a turbulent viscosity computation program that computes a turbulent viscosity on the basis of the physical quantity, and a fluid analysis device that analyzes the fluid on the basis of the physical quantity.

BRIEF DESCRIPTION OF THE DRAWINGS

FIG. 8 is a Table of the computational grid resolution.

DETAILED DESCRIPTION OF THE PREFERRED EMBODIMENTS

Figure 1:
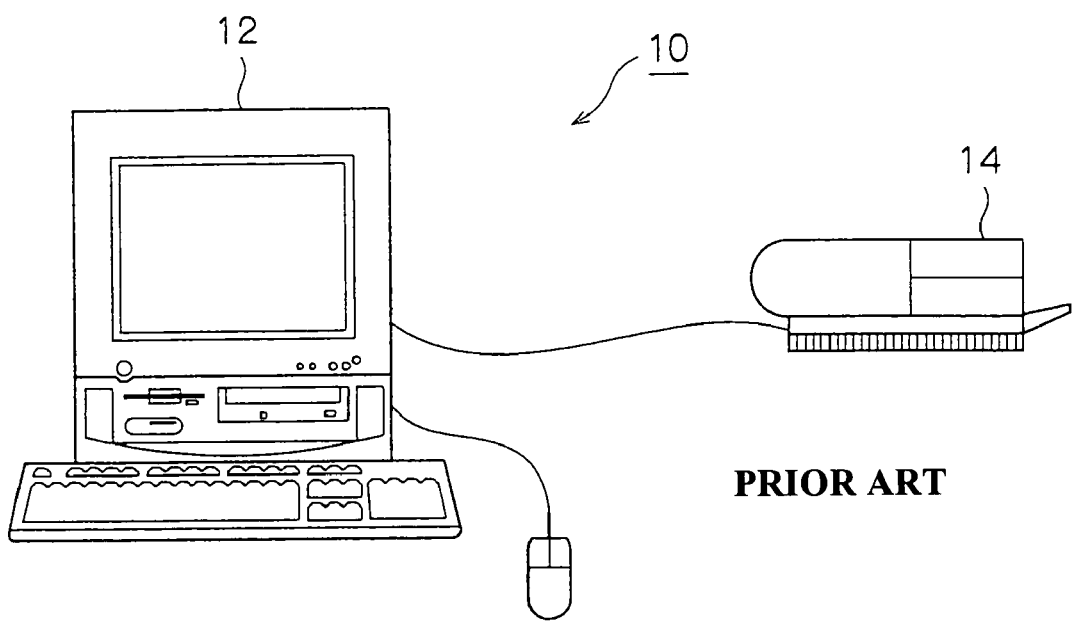
FIG. 1 is a general view of a fluid analysis device.

One example of preferred embodiment of the present invention will be described in detail with reference to the drawings.

First, the principle of fluid analysis in LES in this embodiment will be described.

A wall-damping function in this embodiment is defined as follows.

[Mathematical formula 1]

$$f = \left[1 - \exp\left\{-\left(\frac{y^*}{A}\right)^B\right\}\right]^C \quad (1)$$

$$y^* = u_\varepsilon y / \nu \quad (2)$$

$$u_\varepsilon = (\nu \varepsilon_{SGS})^{1/4} \left(\frac{Dy}{\Delta}\right)^{1/2} \quad D: \text{model constant} \quad (3)$$

Here, $y^*$ in the equation (2) is a physical quantity of specifying a wall-damping function and $u_\varepsilon$ in the equation (3) is a parameter of specifying the physical quantity and is a Kolmogorov's velocity scale.

Further, y is the shortest distance from the surface of a wall, $\nu$ is a coefficient of kinetic viscosity, $\Delta$ is a grid filter width (=computation grid width) in the LES. Still further, A, B, C and D are model constants and $\varepsilon_{SGS}$ is a dissipation rate of turbulent energy $k_{SGS}$ of SGS.

The way the $\varepsilon_{SGS}$ is given includes a method of solving a transport equation of $\varepsilon_{SGS}$ and a method of predicting $\varepsilon_{SGS}$ from $k_{SGS}$. In the latter case, for example, $\varepsilon_{SGS}$ is given as follows.

[Mathematical formula 2]

$$\varepsilon_{SGS} = C_\varepsilon \frac{k_{SGS}^{3/2}}{\Delta} + 2\nu \frac{\partial k_{SGS}^{1/2}}{\partial x_j} \frac{\partial k_{SGS}^{1/2}}{\partial x_j} \quad (4)$$

$C_\varepsilon$: model constant

In the case of predicting the $\varepsilon_{SGS}$ according to the equation (4), $k_{SGS}$ needs to be estimated. A method of estimating $k_{SGS}$ includes some methods. A typical method will be described below.

Firstly, there is a method of solving a transport equation of SGS turbulent energy $k_{SGS}$.

Here, a typical transport equation of SGS turbulent energy $k_{SGS}$ is as follows.

[Mathematical formula 3]

$$\frac{\partial k_{SGS}}{\partial t} + \frac{\partial \bar{u}_j k_{SGS}}{\partial x_j} = \quad (5)$$

$$2\nu_t \bar{S}_{ij} \bar{S}_{ij} + \frac{\partial}{\partial x_j}\left\{\left(\nu + C_{kk} f \Delta \sqrt{k_{SGS}}\right) \frac{\partial k_{SGS}}{\partial x_j}\right\} - \varepsilon_{SGS}$$

Here, $\bar{S}_{ij} = \frac{1}{2}\left(\frac{\partial \bar{u}_i}{\partial x_j} + \frac{\partial \bar{u}_j}{\partial x_i}\right)$ $\bar{u}_j$: velocity component acquired by computation $\bar{(\ )}$ physical quantity subjected to spatial filter $C_{kk}$: model constant Secondly, there is a method of predicting $k_{SGS}$ by subjecting an instantaneous fluid field acquired by computation to a spatial filter.

[Mathematical denotation 4]

$(\sim)$: spatial test filtering

[Mathematical formula 5]

$$k_{SGS} = C_k (\tilde{\bar{u}}_j - \bar{u}_j)^2 \quad (6)$$

$C_k$ = model constant

The reason why a component of $(y/\Delta)$ is included in the above equation (3) will be described.

As described above, in addition to the LES, a technique of analyzing a turbulent flow includes a technique of using a k-$\varepsilon$ model. Also in some kinds of k-$\varepsilon$ model, a wall-damping function using a Kolmogorov's velocity scale is used. In this case, the Kolmogorov's velocity scale used in the k-$\varepsilon$ model is given as $u_\varepsilon = (\nu \varepsilon)^{1/4}$ by the use of a dissipation rate $\varepsilon$ for the whole turbulent energy acquired by solving the equation.

Figure 7A:
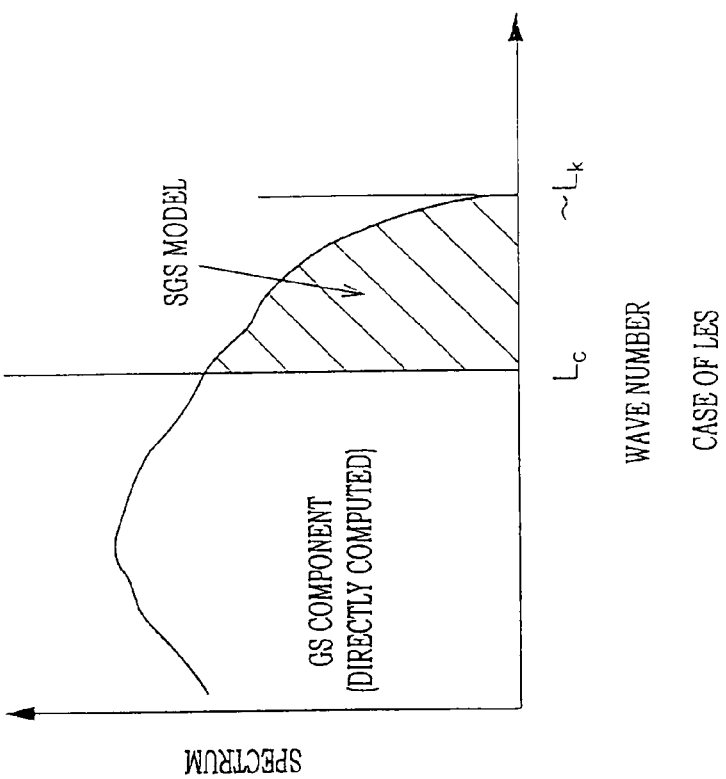
FIGS. 7A and 7B are graphs to show the relationship between wave number of specifying a turbulent flow and energy spectrum of turbulent variations and FIG. 7A shows the case of a k-ε model and FIG. 7B shows the case of an LES, respectively.
Figure 7B:
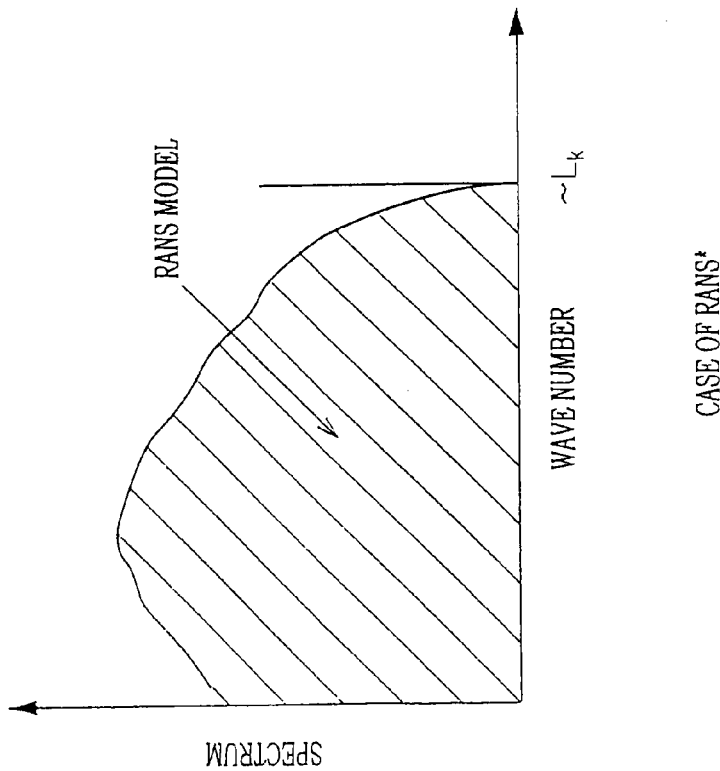

Here, it is also thought that the wall-damping function using the Kolmogorov's velocity scale is used not in the k-$\varepsilon$ model but in the LES. However, in the Kolmogorov's velocity scale used in the k-$\varepsilon$ model, as shown in FIG. 7A, a dissipation rate for components of all wave numbers of turbulent energy is used, so that as shown in FIG. 7B, in the LES in which turbulent components smaller in scale than a grid filter size are modeled, a dissipation rate for components of all wave numbers of turbulent energy can not be used.

Hence, it is proposed that in the case of using the wall-damping function using the Kolmogorov's velocity scale in the LES, in place of the dissipation rate for components of all wave numbers of turbulent energy, a dissipation rate of SGS turbulent energy for components of wave numbers smaller in scale than the grid filter size.

However, the dissipation rate of SGS turbulent energy for components of wave numbers smaller in scale than the grid filter size is smaller in scale than the dissipation rate for components of all wave numbers of turbulent energy and depends on a grid size. Hence, when the above-described wall-damping function is specified by the use of the dissipation rate of the SGS turbulent energy for components of wave numbers smaller in scale than the grid filter size, an appropriate damping effect can not be produced and the wall-damping function becomes one that heavily depends on the grid size used for the computation, which results in reducing the accuracy of computation.

Hence, in this embodiment, at the time of computing the Kolmogorov's velocity scale, in place of the dissipation rate for components of all wave numbers of the turbulent energy, the dissipation rate $\varepsilon_{SGS}$ of SGS turbulent energy for components of wave numbers smaller in scale than the grid filter size is not used as it is, but the dissipation rate $\varepsilon_{SGS}$ of SGS turbulent energy for components of wave numbers smaller in scale than the grid filter size is converted to the dissipation rate for components of all wave numbers of turbulent energy by a predetermined wave number (grid filter size) when the turbulent flow is modeled and a distance from the surface of a wall. To be more detailed, a scale conversion using a length ratio $(y/\Delta)^2$ is conducted and then converted dissipation rate is utilized. Here, y typifies a length scale of turbulent flow (including components of all wave numbers) near the surface of the wall and $\Delta$ typifies a length scale of the SGS component of the turbulent flow. As can be seen from the equation (3), this conversion expresses that the dissipation rate for components of all wave numbers of the turbulent energy is predicted from the dissipation rate $\varepsilon_{SGS}$ of SGS turbulent energy for components of wave numbers smaller then the grid filter size. With this, the wall-damping function used for the computation does not depend on the grid size and hence a suitable damping effect can be produced.

Next, a fluid analysis device 10 in accordance with this embodiment will be described.

As shown in FIG. 1, the fluid analysis device 10 in accordance with this embodiment follows a physical quantity computation program, a wall-damping function computation program, a turbulent viscosity computation program, and a fluid analysis program and has a personal computer 12 and a printer 14.

The personal computer 14 is constructed of a CPU, a ROM, a RAM (memory), a hard disk, and like. The physical quantity computation program, the wall-damping function computation program, the turbulent viscosity computation program, and the fluid analysis program are stored in the hard disk in a hard disk unit.

Next, the physical quantity computation program, the wall-damping function computation program, the turbulent viscosity computation program, and the fluid analysis program in accordance with this embodiment will be described.

Figure 2:
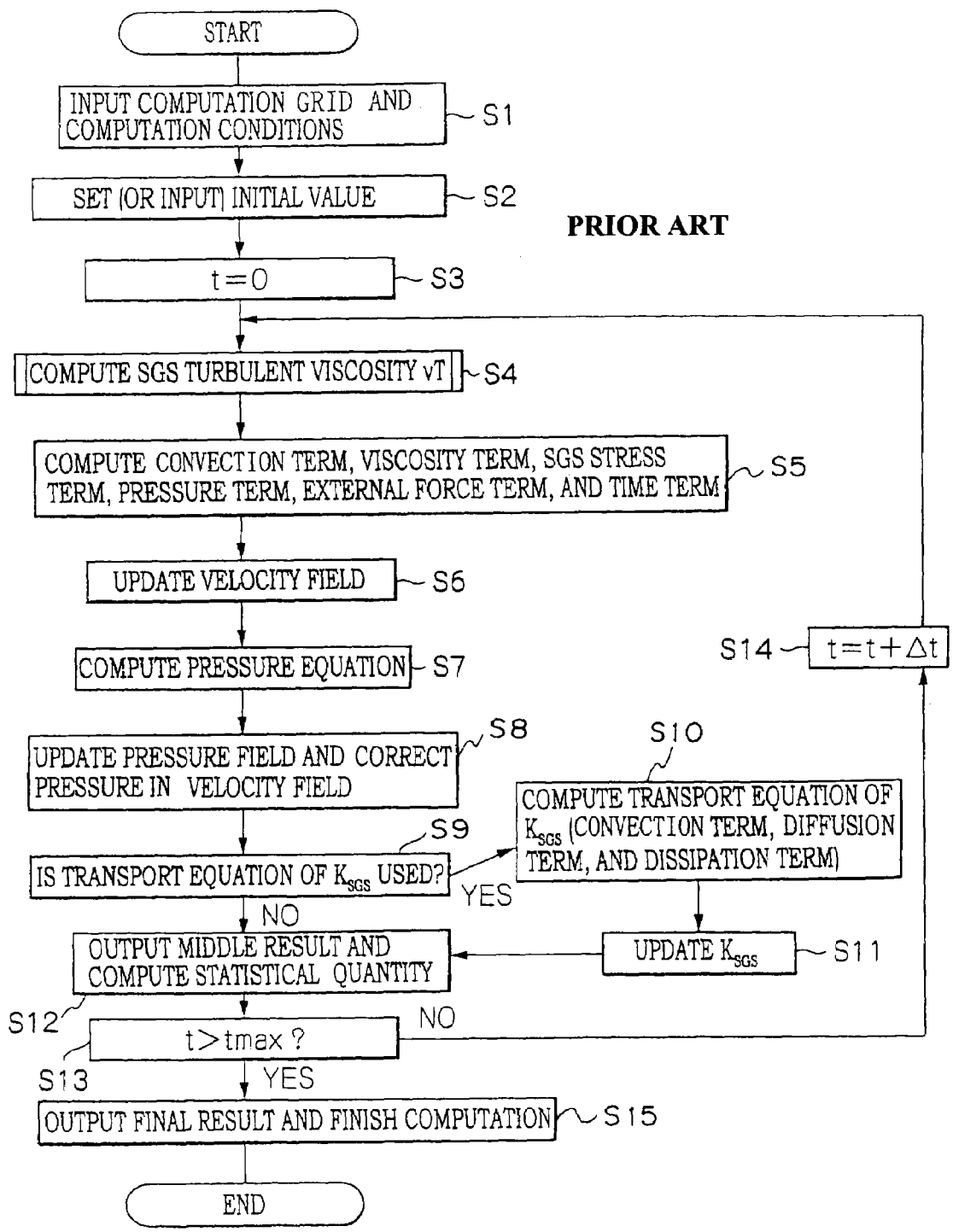
FIG. 2 is a flow chart to show a fluid analysis program.

In FIG. 2 is shown a flow chart to show the fluid analysis program. Here, in this embodiment, a computation procedure of an incompressible flow analysis is used. Fluid analysis in the fluid analysis program is a well-known matter except for the following step S4, so that the fluid analysis will be described in brief.

At step S1, a computation grid, boundary conditions, and computation conditions are inputted via a keyboard or the like and at step S2, initial values of basic physical variables are set. Here, in this regard, it is also recommended that data be read from a data file in which values of the basic physical variables on the respective previously prepared computation grid points are described and be made the initial values.

At step S3, computation is started with analysis time t set at 0.

At step S4, SGS turbulent viscosity νt is computed and stored in the memory. Here, computation contents of the SGS turbulent viscosity νt will be described later.

At step S5, the convection term, the viscosity term, the SGS stress term, the pressure term, the time term, and the external force term of a momentum equation are computed and stored in the memory. Here, when the SGS stress term is computed, the SGS turbulent viscosity νt acquired by the computation at step S4 is used.

At step S6, the predicted value of a time change in a fluid velocity is computed on the basis of the values of the respective terms computed at step S5 and a velocity field is updated.

At step S7, the respective terms of a pressure equation are computed on the basis of the value of velocity computed at step S6 in such a way that the velocity field satisfies a continuity equation and are stored in the memory.

Since the pressure equation constructed at the step S7 becomes linear equation system, at step S8, the linear equation system is solved by a solution method such as a SOR method and a conjugate gradient method and a pressure field is updated and the velocity field is corrected on the basis of the updated value of pressure.

At step S9, it is determined whether or not a solution of an additional equation such as a transport equation of $k_{SGS}$ in the modeling of the SGS stress term is used.

In the case of using the solution of the additional equation, at step S10, the respective terms of the additional equation such as the transport equation of $k_{SGS}$ are computed and stored in the memory and at step S11, a time change in an additional physical quantity such as $k_{SGS}$ on the basis of the values of the respective terms computed at step S10 is computed and the additional physical quantity is updated on the computed time change.

At step S12, middle computation result is outputted (stored in the hard disk, printed out, or displayed on a display unit), if necessary, and a turbulent statistical quantity is computed.

At step S13, it is determined whether or not an analysis time exceeds an analysis end time $t_{max}$. When the analysis time does not exceed the analysis end time $t_{max}$, the analysis time is updated at step S14 and the routine returns to step S4 and processings from step S4 to step S13 are repeated. When the analysis time exceeds the analysis end time $t_{max}$ final computation result is outputted (stored in the hard disk, printed out, or displayed on a display unit) at step S15 and the routine is ended.

At steps S5, S6, a continuity equation subjected to the following spatial filter (grid filter) and a Navier-Stokes equation (in the case of incompressible fluid analysis) are used.

$$\frac{\partial \overline{u}_j}{\partial x_j} = 0 \qquad \text{[Mathematical formula 6]}$$

$$\frac{\partial \overline{u}_i}{\partial t} + \frac{\partial \overline{u}_i \overline{u}_j}{\partial x_j} + \frac{\partial \tau_{ij}}{\partial x_j} = -\frac{1}{\rho}\frac{\partial \overline{p}}{\partial x_i} + \nu \frac{\partial^2 \overline{u}_i}{\partial x_j^2}$$

$$\tau_{ij} = \overline{u_i u_j} - \overline{u}_i \overline{u}_j \qquad \text{[Mathematical formula 7]}$$

t=time, $u_i$=velocity vector, $x_i$=position vector,
ρ=density, p=pressure, ν=kinetic viscosity,
$\tau_{ij}$=sub-grid scale (SGS) scale Then, at steps S7 and S8, the pressure equation obtained by two simultaneous equations shown by the mathematical formula 6 is computed.

In this regard, SGS stress $\tau_{ij}$ that can not be directly computed is modeled on the basis of the following eddy viscosity approximation.

$$\tau^* = \tau_{ij} - \frac{1}{3}\delta_{ij}\tau_{kk} = -2\nu_t \overline{S}_{ij} \qquad \text{[Mathematical formula 8]}$$

$$\overline{S}_{ij} = \frac{1}{2}\left(\frac{\partial \overline{u}_i}{\partial x_j} + \frac{\partial \overline{u}_j}{\partial x_i}\right); \text{ GS}$$

component of strain rate tensor $\delta_{ij}$ = Klonecker's delta

In this case, the SGS stress $\tau_{ij}$ is modeled by giving the turbulent viscosity νt (step S4).

Figure 3:
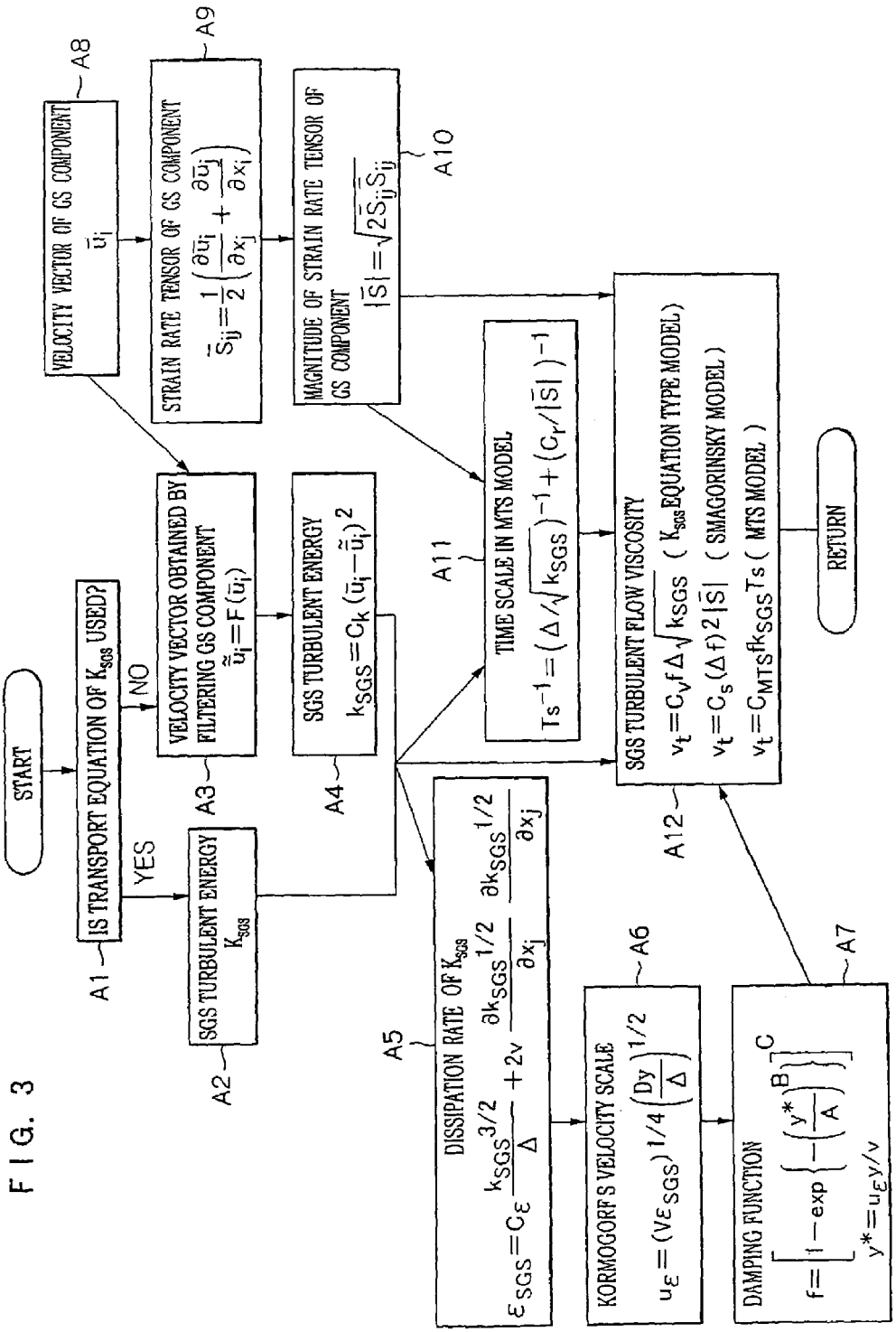
FIG. 3 is a flow chart to show a turbulent flow viscosity computation program at step S4 in the fluid analysis program.

Next, the physical quantity computation program and the turbulent viscosity computation program at step S4 will be described. In FIG. 3 is shown a flow chart to show the turbulent viscosity computation program including the physical quantity computation program.

At step A1, it is determined whether or not an SGS model to be used is one using the transport equation of SGS turbulent energy $k_{SGS}$.

In the case of using the transport equation of SGS turbulent energy $k_{SGS}$, at step A2, SGS turbulent energy $k_{SGS}$ is given as a solution of a solved equation. In the case of not using the transport equation of SGS turbulent energy $k_{SGS}$, at step A3, by filtering the GS components (turbulent components larger in scale than the grid filter size) of velocity, acquired as the computation result, a velocity field subjected to a spatial filter (test filter), which width is larger than that of the grid filter, is computed.

$$\tilde{\tilde{u}}_i = F(\bar{u}_i), F: \text{filtering operator} \quad \text{[Mathematical formula 9]}$$

At step A4, by the use of the turbulent component of the scale between the grid filter size and a test filter size, which is given by the difference between velocity component determined at step A3 and subjected to the test filter and the GS component, the SGS turbulent energy $K_{SGS}$ is estimated as follows from the square mean value of the components in the respective spatial directions.

$$k_{SGS} = C_k (\tilde{u}_i - \bar{\tilde{u}}_i)^2, C_k: \text{model constant} \quad \text{[Mathematical formula 10]}$$

At step A5, by the use of the value of SGS turbulent energy $k_{SGS}$ found at step A2 or step A4, the dissipation rate $\epsilon_{SGS}$ of SGS turbulent energy is estimated as follows.

$$\varepsilon_{SGS} = C_\varepsilon \frac{k_{SGS}^{3/2}}{\Delta} + 2\nu \frac{\partial k_{SGS}^{1/2}}{\partial x_j} \frac{\partial k_{SGS}^{1/2}}{\partial x_j} \quad \text{[Mathematical formula 11]}$$

In this regard, in the case of using an SGS model of the type in which the transport equation of the dissipation rate $\epsilon_{SGS}$ of SGS turbulent energy is also solved as an additional equation, a case is also thought where the dissipation rate $\epsilon_{SGS}$ of SGS turbulent energy, acquired as the solution of the transport equation, is used.

At step A6, a Kolmogorov's velocity scale based on the equation (3) is computed and at step A7, a wall-damping function based on the equation (1) is computed by the use of the Kolmogorov's velocity scale computed at step A6.

When the wall-damping function is computed in the manner described above, the remaining procedures to compute SGS turbulent viscosity νt vary with the previously selected SGS models.

When a $k_{SGS}$ one-equation type model is selected, SGS turbulent viscosity νt is computed in the following manner by the use of the value of SGS turbulent energy $k_{SGS}$ already found at step A2 or step A4.

$$\nu_t = C_\nu f \Delta \sqrt{k_{SGS}} \quad \text{[Mathematical formula 12]}$$

When a Smagorinsky model or an MTS model (Mixed-Time-Scale (MTS) model. Transactions of the Japan Society of Mechanical Engineers. Vol. 68. No. 673, B(2002), page 2572-2579)) is selected, the GS component of strain rate tensor is found in the following manner at step A9.

$$\bar{S}_{ij} = \frac{1}{2} \left( \frac{\partial \bar{u}_i}{\partial x_j} + \frac{\partial \bar{u}_j}{\partial x_i} \right) \quad \text{[Mathematical formula 13]}$$

Then, the magnitude of the GS component of strain rate tensor is found in the following manner at step A10.

$$|\bar{S}| = \sqrt{2 \bar{S}_{ij} \bar{S}_{ij}} \quad \text{[Mathematical formula 14]}$$

When the Smagorinsky model is selected, SGS turbulent viscosity νt is computed in the following manner at step A12 by the use of the magnitude of GS component of strain rate tensor found at step A10.

$$\nu_t = C_s (\Delta f)^2 |\bar{S}|, C_s: \text{model constant} \quad \text{[Mathematical formula 15]}$$

Further, when the MTS model is selected, SGS turbulent viscosity νt is computed in the following manner by the use of the time scale $T_s$ computed at step A11 and the magnitude of strain rate tensor velocity of the GS component found at step A10.

$$\nu_t = C_{MTS} f k_{SGS} T_s, C_{MTS}: \text{model constant} \quad \text{[Mathematical formula 16]}$$

Next, computation result when the above-described eddy viscosity SGS model ($k_{sgs}$ one-equation type model) is used is shown as a specific example.

When the $k_{sgs}$ one-equation type model is used, in consideration of the near-wall asymptotic behavior (turbulent viscosity νt is expressed as a function of the 3rd power of y on the surface of the wall from the definition of eddy viscosity approximation), the coefficients of model B and C in the equation (1) need to satisfy B×C=4/3.

Here, it is assumed that B=4/3 and C=1. The other coefficients of model are arbitrarily determined but are related to each other. The coefficients of model adopted in this embodiment are shown as one example in the following.

When $k_{sgs}$ is given by solving the equation (5), $$C_\nu = 0.054, A = 20, C_\epsilon = 0.835, C_{kk} = 0.1, D = 4 \quad \text{[Mathematical formula 17]}$$

Hereafter, it is assumed that this is a Method A.

When $k_{sgs}$ is given by the equation (6), $$C_\nu = 0.042, A = 20, C_\epsilon = 0.835, C_k = 1, D = 4 \quad \text{[Mathematical formula 18]}$$

Hereafter, it is assumed that this is a Method B.

Further, an computational result when the dissipation rate of SGS turbulent energy for components of wave numbers smaller in scale than the grid filter size is used for specifying a wall-damping function as a comparative example. Here, it is assumed that $$C_\nu = 0.054, A = 26, B = 2, C_\epsilon = 0.835, C_{kk} = 0.1 \quad \text{[Mathematical formula 19]}$$

is an Abe 1 model, and $$C_\nu = 0.12, A = 20, B = 2, C_\epsilon = 0.835, C_{kk} = 0.1 \quad \text{[Mathematical formula 20]}$$

is an Abe 2 model.

Figure 4:
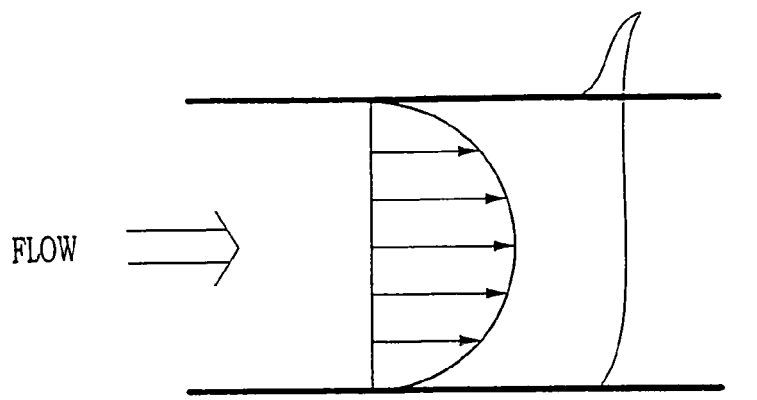
FIG. 4 is an illustration to show a completely developing channel turbulent flow.
Figure 5:
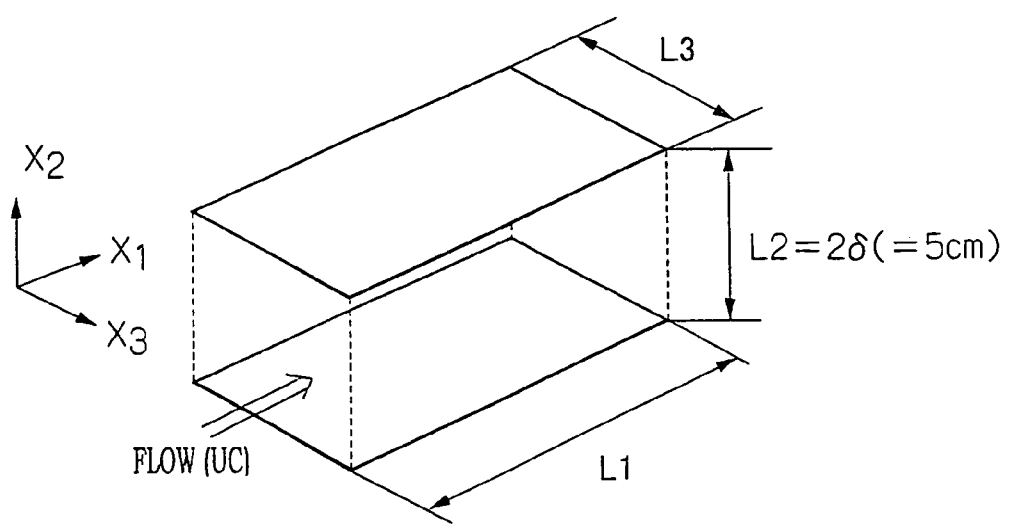
FIG. 5 is a conceptual view to show a computational domain.

As for the computation result, a change in wall-damping function when a grid resolution ($\Delta x^+, \Delta y^+, \Delta Z^+$) in Table 1 is a substantial grid resolution in turbulent analysis and as these values are smaller, the grid resolution is higher) is varied in five steps from Case 1 to Case 5, as shown in FIG. 5 and in Table 1 in FIG. 8, in a completely developing channel turbulent flow (see FIG. 4) is shown in FIGS. 6A to 6D. In the Table 1 in FIG. 8, $\Delta x$, $\Delta y$, $\Delta z$ are computation grid widths in the directions of ×1, ×2, and ×3, and subscript $^+$ is length that is made non-dimensional by friction velocity ($u_\tau$) at the surface of the wall, for example, $y^+ = y\, u_\tau / \nu$.

Figure 6A:
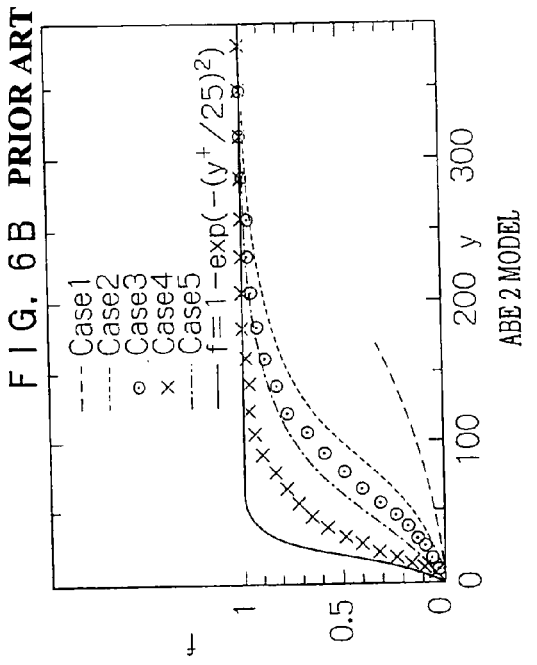
FIGS. 6A to 6D are computational results of a wall-damping function and FIGS. 6A and 6B are computational results of a wall-damping function in the related art and 6C and 6D are computational results of a wall-damping function in this embodiment.
Figure 6B:
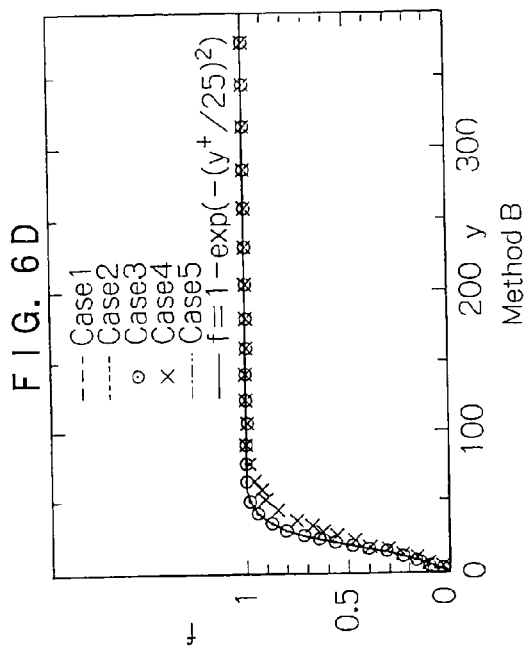

As shown in FIG. 6A, the Abe 1 model depends on the grid resolution very much. The wall-damping function shown by a solid line in the drawing is one of optimum wall-damping functions in a channel turbulent flow and is different from the distribution of wall-damping functions in the Abe 1 model, as can be seen. In particular, in the Case 1 where the grid resolution is the highest, the wall-damping function f is nearly equal to 0 over the whole region and the effective region of the wall-damping function extends extremely to a portion away from the surface of the wall. As shown in FIG. 6B, in the Abe 2 model, the coefficient of model is changed so that the effect of the wall-damping function does not extend to a portion away from the surface of the wall to provide improvement, but the property of substantially depending on the grid resolution is not changed.

Figure 6C:
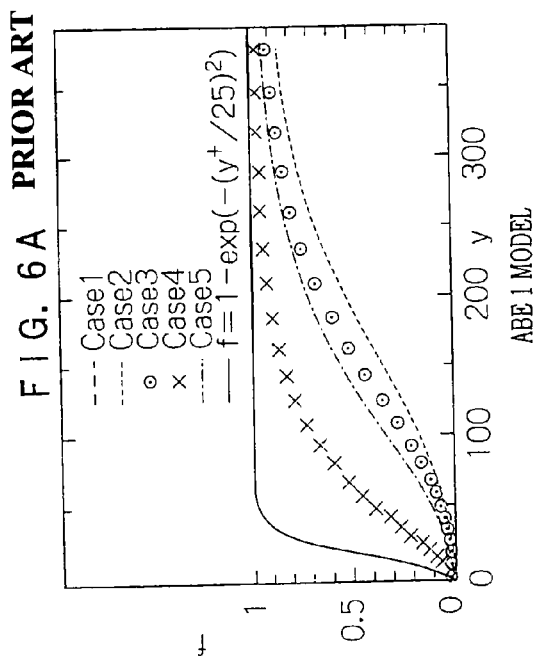
Figure 6D:
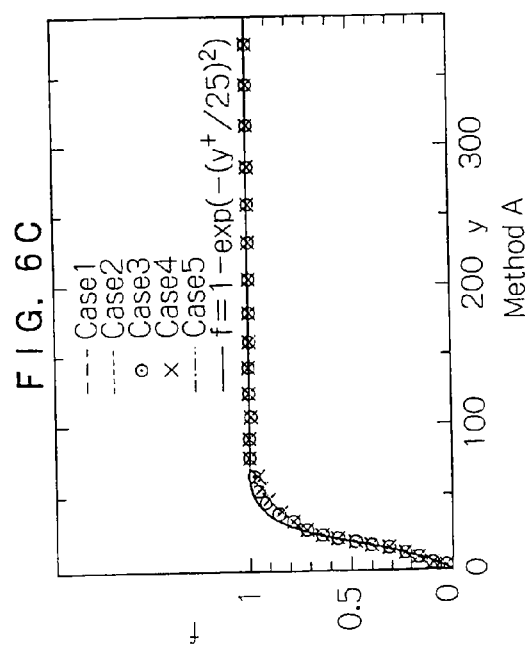

In contrast to this, in the Method A in this embodiment, as shown in FIG. 6C, in any of grid resolutions, the wall-damping functions are nearly equal to the distribution of the optimum wall-damping function, which reveals that, by multiplying the above-described $(Dy/\Delta)^{1/2}$ in the computing of the Kolmogorov's velocity scale, the dependence on the grid resolution is solved to produce an appropriate damping effect. Further, also in the Method B, as can be seen in FIG. 6D, there is produced nearly the same result, that is, the present wall-damping function does not especially depend on the way the turbulent energy ksgs is given but produces excellent result.

In the embodiment described above, the wall-damping function is defined by the equation (1)-(3). However, the invention is not limited to this but may be defined in the following.

First, other wall-damping functions are proposed in RANS. For example, W. Rodi et al. proposed the following wall-damping function ("One-Equation Near-Wall Turbulence Modeling with the Aid of Direct Simulation Data", by W. Rodi; N. N. Mansour; and V. Michelassi, Journal of Fluids Engineering, Vol. 115, page 196-205, 1993).

$$f = 1 - \exp\left\{-\left(\frac{y^*}{A'}\right)^{B'}\right\}$$
$$y^* = y\sqrt{k}/\nu$$
[Mathematical formula 21]

In this case, the square root of turbulence energy k is used in place of the Kolmogorov's velocity scale. Dejoan et al. used this as it was in the computation of the LES ("LES of unsteady turbulence via a one-equation subgrid-scale transport model", by A. Dejoan and R. Schiestel, International Journal of Heat and Fluid Flow, Vol. 23, page 398-412, 2002). In other words, in place of turbulence energy k for the range of the whole wave number, the turbulence energy $k_{SGS}$ of SGS was used as it was. However, this produces an inappropriate damping effect depending on the grid size used for the computation, as is the case with the wall-damping function in the related art. In this case, it is thought that if the mathematical formula 21 is changed to the following formula, the formula can be used in the LES.

$$y^* = \frac{y\sqrt{k_{sgs}}}{\nu} * \left(\frac{D'y}{\Delta}\right)$$
[Mathematical formula 22]

Also in this case, by converting the turbulence energy $k_{SGS}$ of SGS in scale by the use of $(D'y/\Delta)^2$, the turbulent energy k for the range of the whole wave number is predicted. The reason why the mathematical formula 22 becomes an appropriate wall-damping function is as follows.

In this embodiment described by the equations (1) to (3), let's think a case where the dissipation rate $\epsilon_{SGS}$ of SGS turbulent energy is given by turbulent energy $k_{SGS}$ by the use of the equation (4). It is well known that the second term of the equation (4) is as small as can be neglected with respect to the first term except for a portion extremely close to the surface of the wall (wall coordinate $y^* \leqq 5$), which results in estimating y* by the following equation.

$$y^* \sim \left(C_\epsilon \nu \frac{k_{sgs}^{\frac{3}{2}}}{\Delta}\right)^{\frac{1}{4}} \left(\frac{Dy}{\Delta}\right)^{\frac{1}{2}} y/\nu$$
$$= \left\{D^{\frac{2}{3}} C_\epsilon^{\frac{1}{3}} \frac{y\sqrt{k_{sgs}}}{\nu} * \left(\frac{y}{\Delta}\right)\right\}^{\frac{3}{4}}$$
[Mathematical formula 23]

The mathematical formula 22 is different from the mathematical formula 23 only in coefficient and power. The mathematical formula 21 can be made to agree with the equations (1) to (3) by the way the parameters A', B', and D' in the mathematical formulas 21 and 22 are given. For example, when the parameters A, B, and D are respectively made to agree with 20, 4/3, and 4 which are used in the specific example in this embodiment, it is recommendable to set the parameters A', B' and D' at $$A'/D' = 10^{4/3}/C_\epsilon^{1/3}, B' = 1$$
[Mathematical formula 24]

in the mathematical formulas 21 and 22.

The near-wall asymptotic behavior means that turbulent viscosity vt rises up along the 3rd power of y at a portion extremely close to the surface of the wall. Hence, in consideration of the behavior of the wall-damping function f near the wall-surface, the behavior depends on the SGS model to be used. In the case of $k_{SGS}$ one-equation type model, the wall-damping function f becomes the second power of y, in the case of the Smagorinsky model, the wall-damping function f becomes the 1.5th power of y, and in the MTS model, the wall-damping function f becomes the 1st power of y. In the Smagorinsky model, a combination of B=4/3 and C=3/4 or B=1 and C=1 is thought. In this manner, the parameters constructing the wall-damping function depend on the SGS model to be used.

In the examples described above, descriptions have been given by taking the LES model belonging to a linear model among the eddy viscosity models as an example. However, the invention is not limited to this but, for example, can be applied also to a non-linear model in the same manner.

The various examples described above are such that analyze fluid, and gas and liquid can be used as the fluid. In this case, for example, gasoline and oil may be used as the liquid. For example, the invention can be applied to the case of analyzing a state where liquid such as gasoline or oil flows through a pipe. In this case, the inner surface of the pipe becomes the surface of the wall. Further, air may be also used as gas. For example, the invention can be applied to the case of analyzing the state of air where a vehicle is arranged and where air is sent to the vehicle by a blower. In this case, the outer surface of the vehicle becomes the surface of the wall. Here, up to this point, the descriptions have been just provided by taking the vehicle as an example, the invention is not limited to the vehicle but can be applied to various other examples of analyzing fluid.

What is claimed is:

1. A method for analyzing fluid by determining a wall-damping function used in subgrid-scale (SGS) modeling for Large Eddy Simulation (LES), comprising:

identifying a grid filter width to be used in the modeling;

determining an estimated dissipation rate, $\epsilon_{SGS}$, of SGS turbulence energy, $k_{SGS}$, where the SGS turbulence energy, $k_{SGS}$, contains components of wave numbers larger than that of the identified grid filter width, and predicting a dissipation rate, $\epsilon$, from the dissipation rate, $\epsilon SGS$, of SGS turbulence energy, $k_{SGS}$, using a length-scale ratio between y and $\Delta$, where y is the distance from a nearest wall surface and $\Delta$ is the identified grid filter width;

calculating, using a computer, the value of the wall-damping function using the predicted dissipation rate $\epsilon$; and outputting the wall-damping function value of the turbulent flow to a fluid flow analyzer or displaying the value on a display for use in the modeling;

wherein the wall-damping function is $$f = \left[1 - \exp\left\{-\left(\frac{y^*}{A}\right)^B\right\}\right]^C \text{ where}$$

$$y^* = u_\varepsilon y / v, \; u_\varepsilon = (v\varepsilon_{es})^{1/4}, \text{ and}$$

$$\varepsilon_{es} = \varepsilon_{SGS}\left(D\frac{y}{\Delta}\right)^2$$

where $U_\varepsilon$ is a Kolmogorov velocity scale, y is the distance from the nearest wall surface, v is kinematic viscosity, $\epsilon_{es}$, is the predicted dissipation rate of turbulence energy, $\Delta$ is the grid filter width in the LES calculation, A, B, C, and D are model constants, and $\epsilon_{SGS}$ is the dissipation rate of SGS turbulence energy.

2. The method as claimed in claim 1, wherein the dissipation rate of SGS turbulence energy, $\epsilon_{SGS}$ can be obtained by method (1) or (2) as follows:
(1) solving the transport equation of $\epsilon_{SGS}$ together with the transport equations of basic variables in LES, or
(2) estimating $\epsilon_{SGS}$ from the SGS turbulence energy, $k_{SGS}$, $$\varepsilon_{SGS} = C_\varepsilon k_{SGS}^{3/2} + 2v \frac{\delta k_{SGS}^{1/2}}{\delta x_l} \frac{\delta k_{SGS}^{1/2}}{\delta x_l},$$

where $C_\epsilon$ is a model constant, and $k_{SGS}$ can be obtained by solving the transport equation of $k_{SGS}$ together with the transport equations of basic variables in LES, or by applying a spatial test filtering on the instantaneous velocity-component values calculated in LES as follows: $k_{SGS} = C_k(\bar{u}_l - \tilde{\bar{u}}_l)^2$
where $C_k$ is a model constant, ($^-$) denotes the grid filter, and ($\sim$) denotes the spatial test filtering.

3. A computer storage medium containing instructions configured to cause a processor based device to execute a method comprising:
identifying a grid filter width to be used in the modeling;
determining an estimated dissipation rate, $\epsilon_{SGS}$, of SGS turbulence energy, $k_{SGS}$, where the SGS turbulence energy, $k_{SGS}$, contains components of wave numbers larger than that of the identified grid filter width, and
predicting a dissipation rate, $\epsilon$, from the dissipation rate, $\epsilon_{SGS}$, of SGS turbulence energy, $k_{SGS}$, using a length-scale ratio between y and $\Delta$, where y is the distance from a nearest wall surface and $\Delta$ is the identified grid filter width;
calculating the value of the wall-damping function using the predicted dissipation rate $\epsilon$; and
outputting the wall-damping function value of the turbulent flow to a fluid flow analyzer or displaying the value on a display for use in the modeling
wherein the wall-damping function is $$f = \left[1 - \exp\left\{-\left(\frac{y^*}{A}\right)^B\right\}\right]^C \text{ where}$$

$$y^* = u_\varepsilon y / v, \; u_\varepsilon = (v\varepsilon_{es})^{1/4}, \text{ and}$$

$$\varepsilon_{es} = \varepsilon_{SGS}\left(D\frac{y}{\Delta}\right)^2$$

where $u_\epsilon$ is a Kolmogorov velocity scale, y is the distance from the nearest wall surface, v is kinematic viscosity, $\epsilon_{es}$ is the predicted dissipation rate of turbulence energy, $\Delta$ is the grid filter width in the LES calculation, A, B, C, and D are model constants, and $\epsilon_{SGS}$ is the dissipation rate of SGS turbulence energy.

4. The computer storage medium as claimed in claim 3, wherein the dissipation rate of SGS turbulence energy, $\epsilon_{SGS}$, can be obtained by method (1) or (2) as follows:
(1) solving the transport equation of $\epsilon_{SGS}$ together with the transport equations of basic variables in LES, or
(2) estimating $\epsilon_{SGS}$ from the SGS turbulence energy, $k_{SGS}$, $$\varepsilon_{SGS} = C_\varepsilon k_{SGS}^{3/2} + 2v \frac{\delta k_{SGS}^{1/2}}{\delta x_l} \frac{\delta k_{SGS}^{1/2}}{\delta x_l},$$

where $C_\epsilon$ is a model constant, and $k_{SGS}$ can be obtained by solving the transport equation of $k_{SGS}$ together with the transport equations of basic variables in LES, or by applying a spatial test filtering on the instantaneous velocity-component values calculated in LES as follows: $k_{SGS} = C_k(\bar{u}_j - \tilde{\bar{u}}_j)^2$
where $C_k$ is a model constant, ($^-$) denotes the grid filter, and ($\sim$) denotes the spatial test filtering.

5. The computer storage medium as claimed in claim 3, wherein SGS turbulent viscosity is calculated based on the wall-damping function.

6. The computer storage medium as claimed in claim 5, wherein fluid is analyzed based on the SGS turbulent viscosity.

* * * * *

UNITED STATES PATENT AND TRADEMARK OFFICE
CERTIFICATE OF CORRECTION

PATENT NO. : 7,555,413 B2  Page 1 of 1
APPLICATION NO. : 10/986388
DATED : June 30, 2009
INVENTOR(S) : Masahide Inagaki It is certified that error appears in the above-identified patent and that said Letters Patent is hereby corrected as shown below:

Title page, left column, Item (73), Assignee, line 2, change "Kenyyusho" to -- Kenkyusho --

Signed and Sealed this

Seventeenth Day of November, 2009

David J. Kappos
*Director of the United States Patent and Trademark Office*